July 28, 1953   H. HEINS   2,646,609
CRYSTAL AMPLIFIER
Filed July 19, 1948

INVENTOR.
Harold Heins,
BY
Lawrence Burns,
ATTORNEY

Patented July 28, 1953

2,646,609

UNITED STATES PATENT OFFICE 2,646,609

CRYSTAL AMPLIFIER

Harold Heins, Dorchester, Mass., assignor to Sylvania Electric Products Inc., Salem, Mass., a corporation of Massachusetts Application July 19, 1948, Serial No. 39,529

2 Claims. (Cl. 29—25.3)

1

This invention relates to semi-conductors such as metallic crystals, for example of germanium and the like, and particularly to the provision of a control electrode to such a crystal to enable it to act as an electrical amplifier.

Objects of my invention are to provide such a control electrode in an effective manner close to the usual catwhisker contact, and to allow precise control of the spacing between the catwhisker contact and the control electrode.

A feature of the invention is a metallic plating on the crystal surface acting as the control electrode, with a catwhisker electrode at its center, although in some cases the catwhisker may act as the control electrode and the plated metal as the main electrode. Other features are the regulation of the spacing by controlled burning away of a portion of the metallic layer by means of a condenser discharge or the like.

Figure 2:
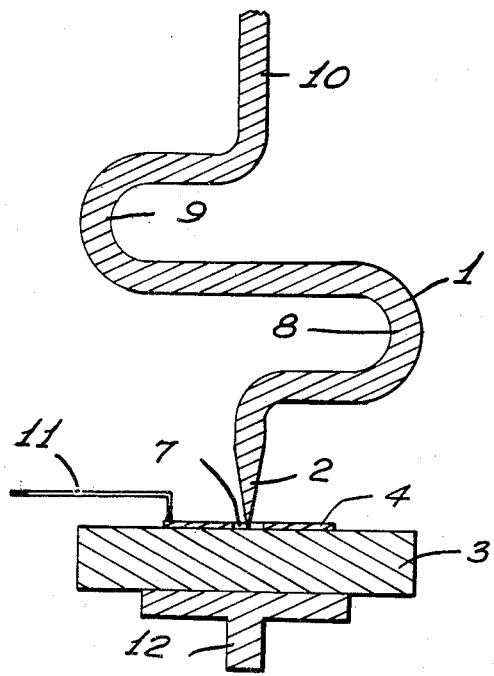
Figure 1:
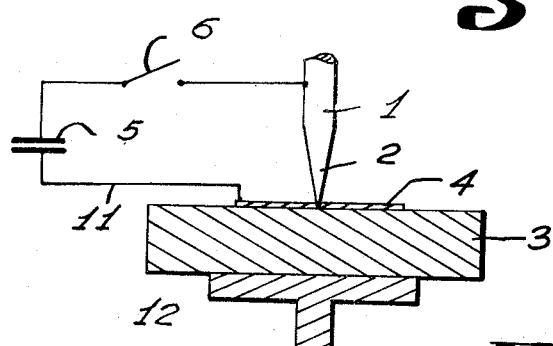

Other features, objects and advantages of the invention will be apparent from the following specification taken in connection with the accompanying drawing in which:

Figure 1 is a sectional view of a crystal assembly before flashing away the central metal layer; and Figure 2 is a view of the first crystal after a predetermined area of the metallic coating has been flashed away.

In Figure 1, the catwhisker 1, which may be a very fine wire, of say 3.5 mils diameter, for example of tungsten or other suitable metal, with a point 2 preferably formed to a true right circular cone or other definitely sharp point. A crystal 3 which may be of germanium, for example, with a small amount of activating impurity such as tin, is coated over its surface, or a portion thereof with a suitable metallic coating, for example nickel, to form the layer 4. This layer may be plated on the crystal surface, condensed on it from an evaporated metal, or may be applied in some other suitable manner. The catwhisker point 2 is placed in contact with the layer 4.

A condenser 5, shown substantially, is charged to the desired voltage and then discharged between the catwhisker 1 and the layer 4 by closing the switch 6. The discharge will "burn away" or "clean off" the metal of layer 4 in the vicinity of the catwhisker point 2, giving the result shown in Figure 2.

A clear space 7 will then extend around the catwhisker point 2, with the metallic layer 4 ending a short distance away from catwhisker point 2. The area of layer 4 burnt away, and the

2 distance between layer 4 and point 2, can be precisely controlled by controlling the size of condenser used and the voltage to which it is charged.

The distance between the electrode or layer 4 and the point 2 will ordinarily be very small, not much more than a thousandth of an inch, and preferably smaller, and my invention provides an effective means of achieving this close spacing.

The catwhisker 1 may have the opposite bends 8 and 9, and the straight portion 10 in line with point 2, if desired, as shown in copending application Serial No. 492,163, filed June 23, 1943, by E. T. Casellini, and now Patent No. 2,572,801, granted October 23, 1951, although other constructions may be used. The mechanical assembly may be as shown in that application, if desired, with the lead-in wire 11 extending out of the crystal at some point as an additional electrode and being insulated from the other electrodes.

The back contact 12 may be soldered to the crystal in the manner well known in the art, for example as in said Casellini application.

The present application discloses a construction aspects of which are claimed in copending application Serial No. 40,259, filed July 23, 1948, by Ezio T. Casellini, and now Patent No. 2,595,052, granted April 29, 1952.

What I claim is:

1. The method of forming a multi-electrode semi-conductor unit including the steps of applying a metallic layer to a body of semi-conductor, applying a point contact to the metallic layer, passing a current through the circuit including the point contact and the metallic layer in series sufficiently intense to clean away the metallic layer from the semiconductor body in a limited area about said point contact and applying a point contact to said body in said area.

2. A process for the maufacture of a circuit element having a body of semi-conductive material and critically spaced electrodes engaging a surface of said body, said electrodes including a point contact and a metallic layer on the semiconductive body having a cutout within which said point contact bears upon said surface in critically spaced relation to the edge of the cutout, said process comprising the steps of forming a solid metallic layer on a surface of the semi-conductive body, applying said point contact against said layer, and passing through said point contact and said layer a current impulse of predetermined magnitude sufficient to effect the removal of part of said layer over an area resulting in the required spacing between said point contact and said layer, with said point contact thereafter bearing directly upon said surface.

HAROLD HEINS.

References Cited in the file of this patent

UNITED STATES PATENTS

| Number | Name | Date |
|---|---|---|
| 1,745,175 | Lillienfeld | Jan. 28, 1930 |
| 1,915,984 | Dowling | June 27, 1933 |
| 2,524,033 | Bardeen | Oct. 3, 1950 |
| 2,524,035 | Bardeen et al. | Oct. 3, 1950 |